United States Patent
Louis et al.

(10) Patent No.: US 11,329,696 B2
(45) Date of Patent: May 10, 2022

(54) COMMUNICATION BETWEEN DEVICES DURING WIRELESS POWER TRANSFER

(71) Applicant: Apple Inc., Cupertino, CA (US)

(72) Inventors: Jeffrey D. Louis, Auckland (NZ); Zaid A. AbuKhalaf, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/183,169

(22) Filed: Feb. 23, 2021

(65) Prior Publication Data

US 2021/0409073 A1  Dec. 30, 2021

Related U.S. Application Data

(60) Provisional application No. 63/043,818, filed on Jun. 25, 2020, provisional application No. 63/043,711, filed on Jun. 24, 2020.

(51) Int. Cl.

| | |
|---|---|
| *H02J 50/80* | (2016.01) |
| *H04B 5/00* | (2006.01) |
| *H04L 27/02* | (2006.01) |
| *H04L 27/10* | (2006.01) |
| *H02J 50/12* | (2016.01) |
| *H02J 50/60* | (2016.01) |

(52) U.S. Cl.
CPC .......... *H04B 5/0037* (2013.01); *H02J 50/12* (2016.02); *H02J 50/80* (2016.02); *H04L 27/02* (2013.01); *H04L 27/10* (2013.01); *H02J 50/60* (2016.02)

(58) Field of Classification Search
CPC . H02J 50/12; H02J 50/20; H02J 50/80; H04B 5/0031; H04B 5/0037; H04L 27/02; H04L 27/10
USPC ............................................. 307/104; 455/41.1
See application file for complete search history.

(56) References Cited

U.S. PATENT DOCUMENTS

| | | | |
|---|---|---|---|
| 9,356,475 B2 | 5/2016 | Kim et al. | |
| 10,938,253 B2 | 3/2021 | Sun et al. | |
| 2016/0190818 A1 | 6/2016 | He et al. | |
| 2016/0336785 A1* | 11/2016 | Gao | .......... H04B 5/0031 |
| 2017/0373537 A1 | 12/2017 | Dayal et al. | |

(Continued)

FOREIGN PATENT DOCUMENTS

CN          108768556 A     11/2018

*Primary Examiner* — William Hernandez
(74) *Attorney, Agent, or Firm* — Treyz Law Group, P.C.; Joseph F. Guihan

(57) ABSTRACT

A wireless power system has a wireless power transmitting device and a wireless power receiving device. The devices in the wireless power system may communicate using in-band communication. The wireless power transmitting device may transmit data to the wireless power receiving device using frequency-shift keying (FSK) modulation. The wireless power receiving device may transmit data to the wireless power transmitting device using amplitude-shift keying (ASK) modulation. While transmitting data to the wireless power receiving device using FSK modulation, the wireless power transmitting device may monitor for ASK modulation from the wireless power receiving device. In response to detecting the ASK modulation from the wireless power receiving device, the wireless power transmitting device may abort the FSK data transmission and process the detected ASK modulation to receive data from the wireless power receiving device.

24 Claims, 5 Drawing Sheets

(56) References Cited

U.S. PATENT DOCUMENTS

2019/0052117 A1\* 2/2019 Martchovsky .......... H02J 50/10
2019/0058360 A1 2/2019 Garbus et al.
2019/0068003 A1 2/2019 Falkenburg et al.
2020/0036229 A1 1/2020 Pinciuc et al.
2020/0119580 A1 4/2020 Park et al.

\* cited by examiner

COMMUNICATION BETWEEN DEVICES DURING WIRELESS POWER TRANSFER

This application claims priority to U.S. provisional patent application No. 63/043,711 filed Jun. 24, 2020, and to U.S. provisional patent application No. 63/043,818 filed Jun. 25, 2020, which are hereby incorporated by reference herein in their entireties.

FIELD

This relates generally to power systems, and, more particularly, to wireless power systems for charging electronic devices.

BACKGROUND

In a wireless charging system, a wireless power transmitting device such as a charging mat or charging puck wirelessly transmits power to a wireless power receiving device such as a portable electronic device. The portable electronic device has a coil and rectifier circuitry. The coil of the portable electronic device receives alternating-current wireless power signals from the wireless power transmitting device. The rectifier circuitry converts the received signals into direct current power.

SUMMARY

A wireless power system has a wireless power transmitting device and a wireless power receiving device. The wireless power transmitting device may include a coil and wireless power transmitting circuitry coupled to the coil. The wireless power transmitting circuitry may be configured to transmit wireless power signals with the coil. The wireless power receiving device may include a coil that is configured to receive wireless power signals from the wireless power transmitting device and rectifier circuitry that is configured to convert the wireless power signals to direct current power.

The devices in the wireless power system may communicate using in-band communication. The wireless power transmitting device may transmit data to the wireless power receiving device using frequency-shift keying (FSK) modulation. The wireless power receiving device may transmit data to the wireless power transmitting device using amplitude-shift keying (ASK) modulation.

While transmitting data to the wireless power receiving device using FSK modulation, the wireless power transmitting device may monitor for ASK modulation from the wireless power receiving device. In response to detecting the ASK modulation from the wireless power receiving device, the wireless power transmitting device may abort the FSK data transmission and process the detected ASK modulation to receive data from the wireless power receiving device.

DETAILED DESCRIPTION

A wireless power system has a wireless power transmitting device that transmits power wirelessly to a wireless power receiving device. The wireless power transmitting device may be a device such as a wireless charging mat, wireless charging puck, wireless charging stand, wireless charging table, or other wireless power transmitting equipment. The wireless power transmitting device may be a stand-alone device or built into other electronic devices such as a laptop or tablet computer, cellular telephone or other electronic device. The wireless power transmitting device has one or more coils that are used in transmitting wireless power to one or more wireless power receiving coils in the wireless power receiving device. The wireless power receiving device is a device such as a cellular telephone, watch, media player, tablet computer, pair of earbuds, remote control, laptop computer, electronic pencil or stylus, other portable electronic device, or other wireless power receiving equipment.

During operation, the wireless power transmitting device supplies alternating-current signals to one or more wireless power transmitting coils. This causes the coils to transmit alternating-current electromagnetic signals (sometimes referred to as wireless power signals) to one or more corresponding coils in the wireless power receiving device. Rectifier circuitry in the wireless power receiving device converts received wireless power signals into direct-current (DC) power for powering the wireless power receiving device.

Figure 1:
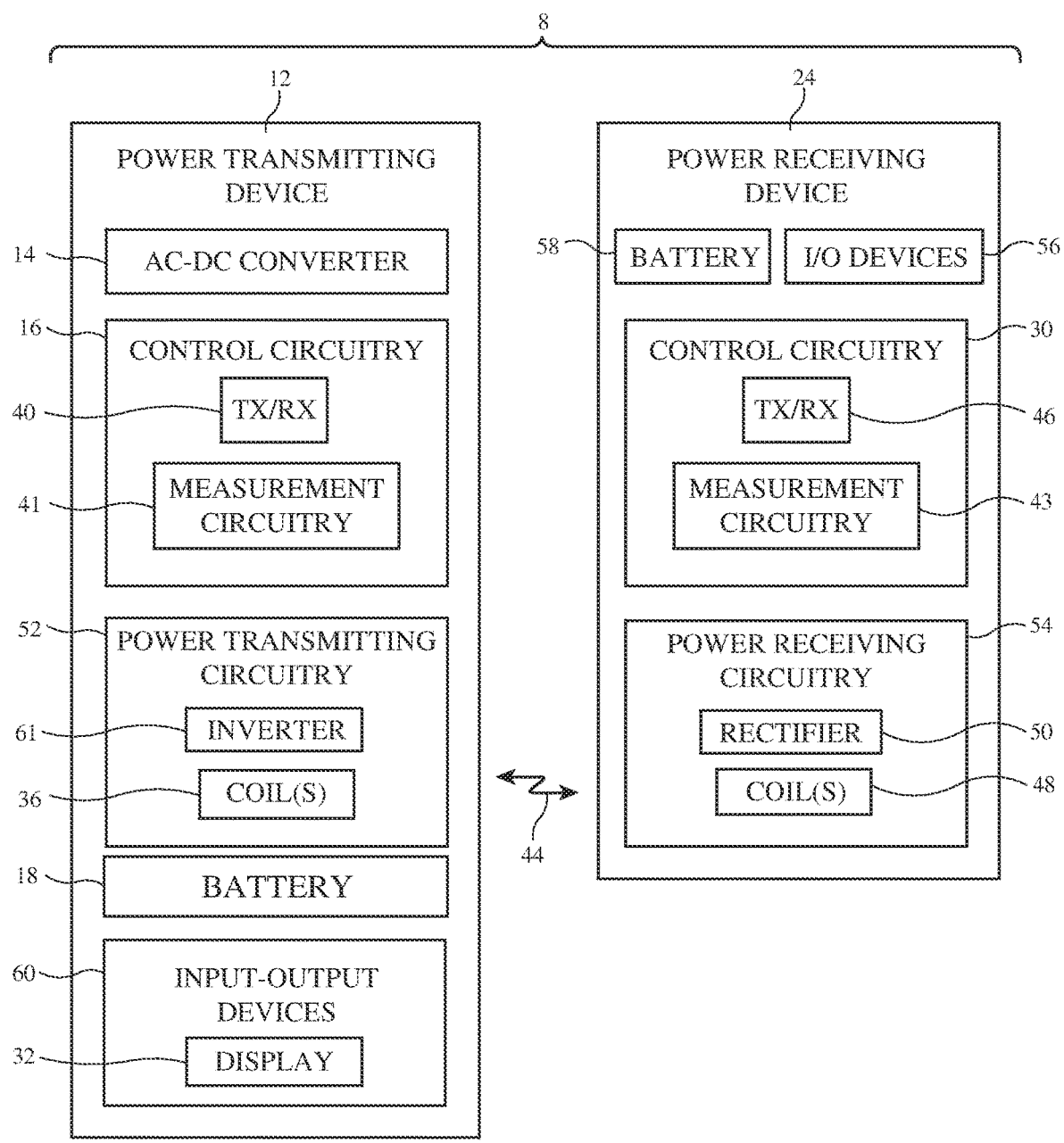
FIG. 1 is a schematic diagram of an illustrative wireless charging system that includes a wireless power transmitting device and a wireless power receiving device in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data, processing user input, handling negotiations between devices 12 and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless power transmitting device that includes power adapter circuitry), may be a wireless charging puck or other device that is coupled to a power adapter or other equipment by a cable, may be equipment that has been incorporated into furniture, a vehicle, or other system, may be a removable battery case, or may be other wireless power transfer equipment. In some cases, power transmitting device 12 may be a portable electronic device such as a cellular telephone, watch, media player, tablet computer, pair of earbuds, remote control, laptop computer, electronic pencil or stylus, or other portable electronic device. Power transmitting device 12 may also be capable of receiving wireless power (and may have similar power receiving components as power receiving device 24).

Power receiving device 24 may be a portable electronic device such as a cellular telephone, watch, media player, tablet computer, pair of earbuds, remote control, laptop computer, electronic pencil or stylus, other portable electronic device, or other wireless power receiving equipment.

Power transmitting device 12 may be coupled to a wall outlet (e.g., an alternating current power source), may have a battery such as battery 18 for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16 and other components within device 12. In some cases, a single electronic device may be configured to serve as both a power receiving device and a power transmitting device (e.g., the device has both power transmitting circuitry and power receiving circuitry).

The DC power may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from switches such as transistors) that is turned on and off based on control signals provided by control circuitry 16 to create AC current signals through one or more wireless power transmitting coils such as wireless power transmitting coils 36. Coils 36 may be arranged in a planar coil array (e.g., in configurations in which device 12 is a wireless charging mat) or may be arranged to form a cluster of coils (e.g., in configurations in which device 12 is a wireless charging puck). In some arrangements, device 12 may have only a single coil. In other arrangements, device 12 may have multiple coils (e.g., two coils, more than two coils, four or more coils, six or more coils, 2-6 coils, fewer than 10 coils, etc.).

As the AC currents pass through one or more coils 36, alternating-current electromagnetic (e.g., magnetic) fields (wireless power signals 44) are produced that are received by one or more corresponding receiver coils such as coil(s) 48 in power receiving device 24. Device 24 may have a single coil 48, at least two coils 48, at least three coils 48, at least four coils 48, or other suitable number of coils 48.

When the alternating-current electromagnetic fields (sometimes referred to as magnetic flux) are received by coils 48 (e.g., when magnetic flux passes through coils 48), corresponding alternating-current currents are induced in coils 48. Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometimes referred to as rectifier output voltage Vrect) can be used in charging a battery such as battery 58 and can be used in powering other components in device 24. For example, device 24 may include input-output devices 56. Input-output devices 56 may include input devices for gathering user input and/or making environmental measurements and may include output devices for providing a user with output. As an example, input-output devices 56 may include a display for creating visual output, a speaker for presenting output as audio signals, light-emitting diode status indicator lights and other light-emitting components for emitting light that provides a user with status information and/or other information, haptic devices for generating vibrations and other haptic output, and/or other output devices. Input-output devices 56 may also include sensors for gathering input from a user and/or for making measurements of the surroundings of system 8. Illustrative sensors that may be included in input-output devices 56 include three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible cameras with respective infrared and/or visible digital image sensors and/or ultraviolet light cameras), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors such as infrared proximity sensors, other proximity sensors, force sensors, sensors such as contact sensors based on switches, gas sensors, pressure sensors, moisture sensors, magnetic sensors, audio sensors (microphones), ambient light sensors, optical sensors for making spectral measurements and other measurements on target objects (e.g., by emitting light and measuring reflected light), microphones for gathering voice commands and other audio input, distance sensors, motion, position, and/or orientation sensors that are configured to gather information on motion, position, and/or orientation (e.g., accelerometers, gyroscopes, compasses, and/or inertial measurement units that include all of these sensors or a subset of one or two of these sensors), sensors such as buttons that detect button press input, joysticks with sensors that detect joystick movement, keyboards, and/or other sensors. Any of these input-output components (which form a load for device 24) may be powered by the DC voltages produced by rectifier circuitry 50 (and/or DC voltages produced by battery 58).

Device 12 may optionally have one or more input-output devices 60 (e.g., input devices and/or output devices of the type described in connection with input-output devices 56). For example, device 12 may include a display 32 and one or more sensors.

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In-band transmissions between devices 12 and 24 may be performed using coils 36 and 48.

It is desirable for power transmitting device 12 and power receiving device 24 to be able to communicate information such as received power, states of charge, and so forth, to control wireless power transfer. However, this process need not involve the transmission of device identification information. Out of an abundance of caution, it is noted that to the extent that any implementation of this charging technology involves the use of device identification information (or more generally, personally identifiable information), implementers should follow privacy policies and practices that are generally recognized as meeting or exceeding industry or governmental requirements for maintaining the privacy of users. In particular, identification information data should be managed and handled so as to minimize risks of unintentional or unauthorized access or use, and the nature of authorized use should be clearly indicated to users. Where possible, such identification information may be abstracted, such as by using some but not all bits in a byte of information, so that the resulting identification is not globally unique but still sufficient to facilitate communication under reasonable device usage scenarios.

Control circuitry 16 has external object measurement circuitry 41 that may be used to detect external objects adjacent to device 12 (e.g., on the top of a charging surface). Circuitry 41 may detect foreign objects such as coils, paper clips, and other metallic objects and may detect the presence of wireless power receiving devices 24 (e.g., circuitry 41 can detect the presence of one or more coils 48). In arrangements in which device 12 forms a charging puck, the charging puck may have a surface shape that mates with the shape of device 24. A puck or other device 12 may, if desired, have magnets (sometimes referred to as magnetic alignment structures) that removably attach device 12 to device 24, in the process aligning coil 48 with coil 36 for efficient wireless charging.

During object detection and characterization operations, external object measurement circuitry 41 can be used to make measurements on coils 36 to determine whether any devices 24 are present on device 12. Additional coils (that are not used for power transmission) and/or other additional sensors may be used for object detection and characterization operations if desired.

In an illustrative arrangement, measurement circuitry 41 of control circuitry 16 contains signal generator circuitry (e.g., oscillator circuitry for generating AC probe signals at one or more probe frequencies, a pulse generator that can create impulses so that impulse responses can be measured to gather inductance information, Q-factor information, etc.) and signal detection circuitry (e.g., filters, analog-to-digital converters, impulse response measurement circuits, etc.). During measurement operations, switching circuitry in device 12 (e.g., in the puck of device 12) may be adjusted by control circuitry 16 to switch each of coils 36 into use. As each coil 36 is selectively switched into use, control circuitry 16 uses the signal generator circuitry of signal measurement circuitry 41 to apply a probe signal to that coil while using the signal detection circuitry of signal measurement circuitry 41 to measure a corresponding response. Measurement circuitry 43 in control circuitry 30 and/or in control circuitry 16 may also be used in making current and voltage measurements (e.g., so that this information can be used by device 24 and/or device 12).

Figure 2:
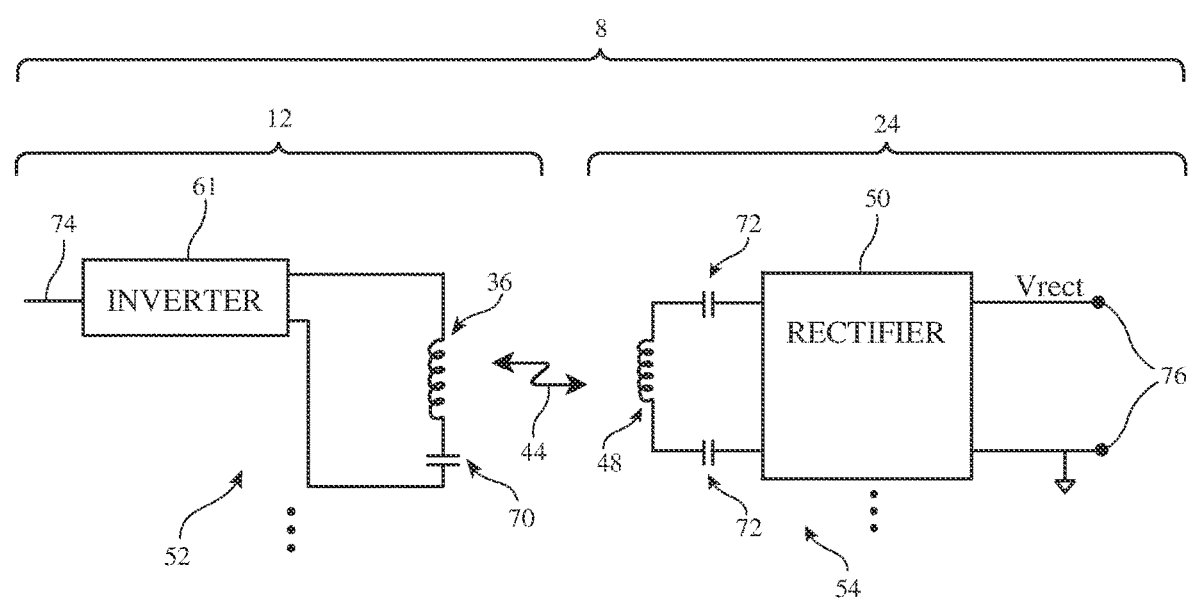
FIG. 2 is a circuit diagram of illustrative wireless power transmitting and receiving circuitry in accordance with an embodiment.

FIG. 2 is a circuit diagram of illustrative wireless charging circuitry for system 8. As shown in FIG. 2, circuitry 52 may include inverter circuitry such as one or more inverters 61 or other drive circuitry that produces wireless power signals that are transmitted through an output circuit that includes one or more coils 36 and capacitors such as capacitor 70. In some embodiments, device 12 may include multiple individually controlled inverters 61, each of which supplies drive signals to a respective coil 36. In other embodiments, an inverter 61 is shared between multiple coils 36 using switching circuitry. In yet another embodiment, device 12 includes a single inverter and a single corresponding coil 36.

During operation, control signals for inverter(s) 61 are provided by control circuitry 16 at control input 74. A single inverter 61 and single coil 36 is shown in the example of FIG. 2, but multiple inverters 61 and multiple coils 36 may be used, if desired. In a multiple coil configuration, switching circuitry (e.g., multiplexer circuitry) can be used to couple a single inverter 61 to multiple coils 36 and/or each coil 36 may be coupled to a respective inverter 61. During wireless power transmission operations, transistors in one or more selected inverters 61 are driven by AC control signals from control circuitry 16. The relative phase between the inverters can be adjusted dynamically (e.g., a pair of inverters 61 may produce output signals in phase or out of phase (e.g., 180 degrees out of phase).

The application of drive signals using inverter(s) 61 (e.g., transistors or other switches in circuitry 52) causes the output circuits formed from selected coils 36 and capacitors 70 to produce alternating-current electromagnetic fields (signals 44) that are received by wireless power receiving circuitry 54 using a wireless power receiving circuit formed from one or more coils 48 and one or more capacitors 72 in device 24.

If desired, the relative phase between driven coils 36 (e.g., the phase of one of coils 36 that is being driven relative to another adjacent one of coils 36 that is being driven) may be adjusted by control circuitry 16 to help enhance wireless power transfer between device 12 and device 24. Rectifier circuitry 50 is coupled to one or more coils 48 (e.g., a pair of coils) and converts received power from AC to DC and supplies a corresponding direct current output voltage Vrect across rectifier output terminals 76 for powering load circuitry in device 24 (e.g., for charging battery 58, for powering a display and/or other input-output devices 56, and/or for powering other components). A single coil 48 or multiple coils 48 may be included in device 24.

As previously mentioned, in-band transmissions using coils 36 and 48 may be used to convey (e.g., transmit and receive) information between devices 12 and 24. With one illustrative configuration, frequency-shift keying (FSK) is used to transmit in-band data from device 12 to device 24 and amplitude-shift keying (ASK) is used to transmit in-band data from device 24 to device 12. Power may be conveyed wirelessly from device 12 to device 24 during these FSK and ASK transmissions (e.g., at least some wireless power is conveyed during the in-band communications, whether or not devices 12 and 24 have completed a handshake process and agreed upon a sustained power transfer level). While power transmitting circuitry 52 is driving AC signals into one or more of coils 36 to produce signals 44 at the power transmission frequency, wireless transceiver circuitry 40 may use FSK modulation to modulate the power transmission frequency of the driving AC signals and thereby modulate the frequency of signals 44. In device 24, coil 48 is used to receive signals 44. Power receiving circuitry 54 uses the received signals on coil 48 and rectifier 50 to produce DC power. At the same time, wireless transceiver circuitry 46 monitors the frequency of the AC signal passing through coil(s) 48 and uses FSK demodulation to extract the transmitted in-band data from signals 44. This approach allows FSK data (e.g., FSK data packets) to be transmitted in-band from device 12 to device 24 with coils 36 and 48 while power is simultaneously being wirelessly conveyed from device 12 to device 24 using coils 36 and 48.

In-band communications between device 24 and device 12 may use ASK modulation and demodulation techniques. Wireless transceiver circuitry 46 transmits in-band data to device 12 by using a switch (e.g., one or more transistors in transceiver 46 that are coupled coil 48) to modulate the impedance of power receiving circuitry 54 (e.g., coil 48). This, in turn, modulates the amplitude of signal 44 and the amplitude of the AC signal passing through coil(s) 36. Wireless transceiver circuitry 40 monitors the amplitude of the AC signal passing through coil(s) 36 and, using ASK demodulation, extracts the transmitted in-band data from these signals that was transmitted by wireless transceiver circuitry 46. The use of ASK communications allows ASK data bits (e.g., ASK data packets) to be transmitted in-band from device 24 to device 12 with coils 48 and 36 while power is simultaneously being wirelessly conveyed from device 12 to device 24 using coils 36 and 48.

The example of FSK modulation being used to convey in-band data from power transmitting device 12 to power receiving device 24 and ASK modulation being used to convey in-band data from power receiving device 24 to power transmitting device 12 is merely illustrative. In general, any desired communication techniques may be used to convey information from power transmitting device 12 to power receiving device 24 and from power receiving device 24 to power transmitting device 12. In general, wireless power may simultaneously be conveyed between devices during in-band communications (using ASK or FSK).

The power transmission frequency used for transmission of wireless power may be, for example, a predetermined frequency of about 110 kHz, about 125 kHz, about 175 kHz, at least 80 kHz, at least 100 kHz, between 100 kHz and 205 kHz, less than 500 kHz, less than 300 kHz, or other desired wireless power frequency. In some configurations, the power transmission frequency may be negotiated in communications between devices 12 and 24. In other configurations, the power transmission frequency may be fixed.

It has been described that power may be simultaneously conveyed between devices while using in-band communication for data transmission between the devices. In other words, in some examples in-band communications may rely on modulation of the power transmission signal (e.g., modulating the power transmission frequency or modulating amplitude of a signal at the power transmission frequency).

However, it should be noted that in-band communication may occur between devices before the devices agree upon a power transfer rate, power transmission frequency, etc. After initial detection and inductive coupling, devices may go through a handshake process to determine compatibility, negotiate power transfer frequency, negotiate power transfer rate, etc. During this process, in-band communication may involve FSK and/or ASK modulation of signals at the power transmission frequency. Therefore, wireless power is transmitted during this process. This is advantageous as it allows the devices to complete the handshake process even if the power receiving device has little or no remaining battery power. This transmission of wireless power during in-band communications may occur during the handshake process even if, ultimately, the negotiations between the devices result in no sustained transmission of wireless power (e.g., even if the devices do not enter a dedicated power transfer phase).

The aforementioned FSK and ASK modulation and demodulation techniques may be used to transmit data packets between any two devices within system 8. Each data packet may include numerous data bits (sometimes referred to as bits). The data bits may be grouped into bytes, with each byte including any desired number of bits (e.g., 8 bits).

Communication of a bit using FSK modulation may take a longer period of time than communication of a bit using ASK modulation. This is illustrated in FIGS. 3 and 4.

During FSK modulation, power transmitting device 12 may switch its operating frequency between a first operating frequency (e.g., unmodulated operating frequency $f_{op}$) and a second operating frequency (e.g., modulated operating frequency $f_{mod}$). The difference between the two frequencies has both a polarity (indicating whether the difference between $f_{mod}$ and $f_{op}$ is positive or negative) and a depth (indicating the magnitude of the difference between $f_{mod}$ and $f_{op}$).

Using the unmodulated operating frequency and the selected modulated operating frequency, the power transmitter may transmit bits using FSK modulation. The power transmitter may use a bit encoding scheme to transmit the bits using FSK modulation. In one illustrative example, the power transmitter may use a differential bi-phase encoding scheme to modulate data bits using the power signal. This type of bi-phase encoding scheme is shown in FIG. 3.

Figure 3:
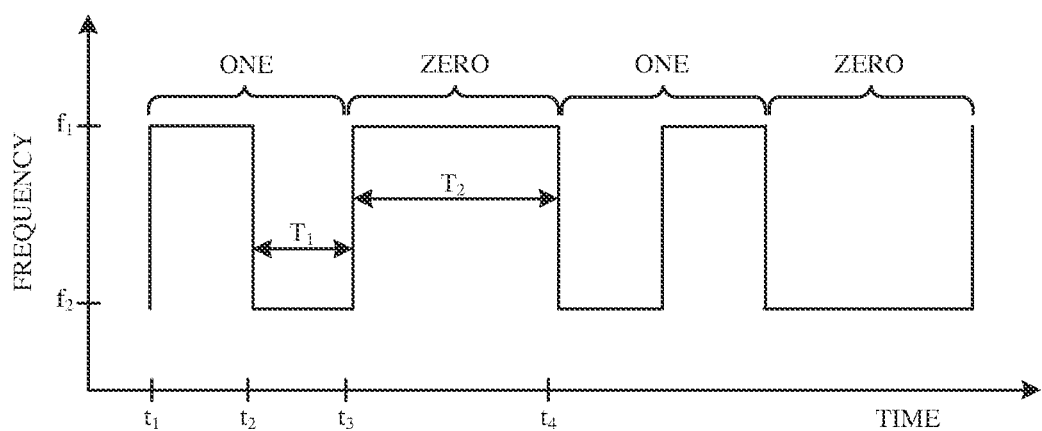
FIG. 3 is a diagram showing an illustrative frequency-shift keying (FSK) modulation bit encoding scheme in accordance with an embodiment.
Figure 4:
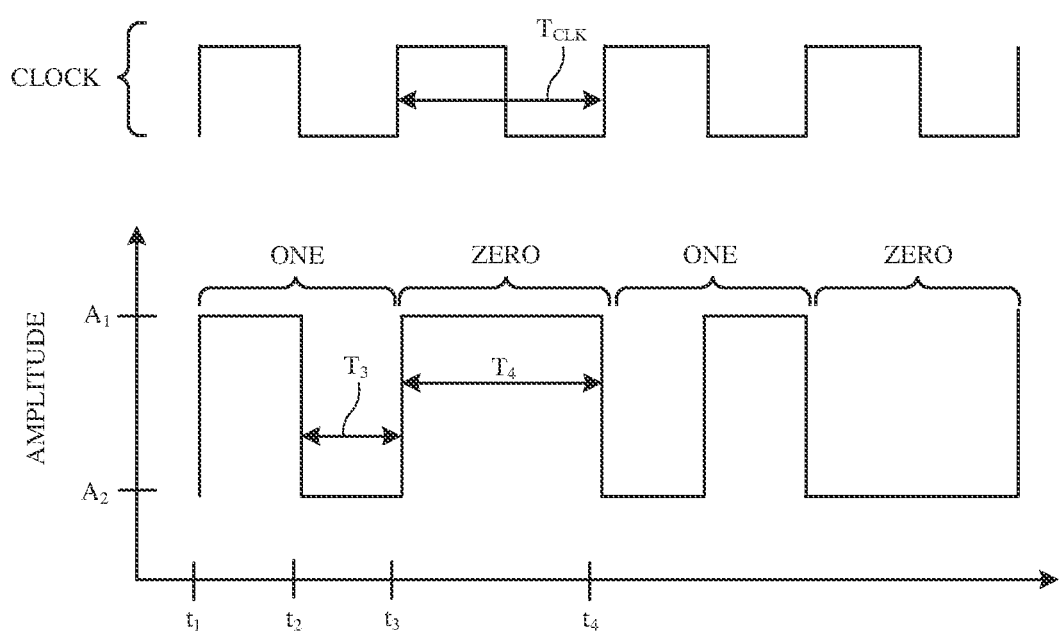
FIG. 4 is a diagram showing an illustrative amplitude-shift keying (ASK) modulation bit encoding scheme in accordance with an embodiment.

FIG. 3 shows the power signal frequency over time during FSK modulation. The power signal frequency transitions between frequencies $f_1$ and $f_2$ to encode bits. Frequencies $f_1$ and $f_2$ may be equal to $f_{op}$ and $f_{mod}$ as discussed previously, with either $f_{op}$ or $f_{mod}$ being the higher of the two frequencies. As shown, in the encoding scheme of FIG. 3, a transition between the two frequencies occurs at the start of each bit. To encode a 'one' bit, there are two transitions in the power signal frequency. To encode a 'zero' bit, there is one transition in the power signal frequency.

For example, at $t_1$ the operating frequency (power signal frequency) transitions from $f_2$ to $f_1$. This indicates the start of encoding the one bit. The operating frequency may remain at $f_1$ for a given number of cycles of the power signal (e.g., 256 cycles) then transition back to $f_2$ at $t_2$. The operating frequency remains at $f_2$ for the given number of cycles. At $t_3$, the encoding of the one bit is complete.

At $t_3$, the operating frequency (power signal frequency) transitions from $f_2$ to $f_1$. This indicates the start of encoding the zero bit. The operating frequency may remain at $f_1$ for a given number of cycles (e.g., 512 cycles) then transition back to $f_2$ at $t_4$. At $t_4$, the encoding of the zero bit is complete.

To summarize, each bit (either a 'one' or 'zero') is transmitted over the same period of time (e.g., duration $T_2$ in FIG. 3). For a zero bit, the operating frequency transitions once at the beginning of the period of time and then remains at the same operating frequency for the entire period of time ($T_2$). For a one bit, the operating frequency transitions once at the beginning of the period of time and again halfway through transmission of the bit. During encoding of a one bit, the operating frequency is therefore at both frequencies $f_1$ and $f_2$ for an equal duration of time $T_1$ that is half of $T_2$.

During encoding of bits using the differential bi-phase encoding scheme of FIG. 3, the frequency remains constant for either a duration of time $T_2$ or $T_1$ before transitioning to the other frequency. $T_1$ is half of $T_2$. These periods of time where the frequency is constant may be referred to as modulation states. The modulation states (sometimes referred to as bit periods) are used to convey bits using the bit encoding scheme.

Herein, an example will be described where the duration of each bit transmission (e.g., $T_2$) is 512 cycles total. $T_1$ is therefore 256 cycles. For encoding a zero bit, the operating frequency transitions and then is held constant for 512 cycles. For encoding a one bit, the operating frequency transitions, is held constant for 256 cycles, transitions again, and is then again held constant for 256 cycles. The modulation states (where the operating frequency is constant) are therefore either 512 cycles or 256 cycles.

Using an illustrative power transmission frequency of 110 kHz and the example of 512 cycles per bit, the total time to transmit each bit (e.g., the length of time for 512 cycles at 110 kHz) is 4.65 milliseconds. The modulation states (where the operating frequency is constant) are therefore either 4.65 milliseconds (for 512 cycles) or 2.33 milliseconds (for 256 cycles).

During ASK modulation, the power receiving device similarly uses an encoding scheme to modulate data bits onto the power signal. In one example, the power receiving device may use a differential bi-phase encoding scheme (similar to as in FSK modulation described above). However, the ASK modulation may be asynchronous with the power signal. Instead of modulating a power signal parameter in synchronization with the power signal (as with FSK modulation), the ASK modulation may be performed according to an internal clock that has a constant frequency.

FIG. 4 shows the power signal amplitude over time during ASK modulation. The power signal amplitude transitions between amplitudes $A_1$ and $A_2$ to encode bits. As previously discussed, during ASK modulation the power receiving device 24 may use a switch (e.g., one or more transistors in transceiver 46 that are coupled coil 48) to modulate the impedance of power receiving circuitry 54 (e.g., coil 48). This, in turn, modulates the amplitude of signal 44 and the amplitude of the AC signal passing through coil(s) 36. The amplitude of the signal passing through coil(s) 36 may vary between two amplitude magnitudes (e.g., $A_1$ and $A_2$).

As shown, in the encoding scheme of FIG. 4, a transition between the two amplitudes occurs at the start of each bit. To encode a 'one' bit, there are two transitions in the power signal amplitude. To encode a 'zero' bit, there is one transition in the power signal amplitude.

With the ASK modulation of FIG. 4, the transitions in the power signal amplitude coincide with transitions in the clock signal (also depicted in FIG. 4). The clock signal may cycle through high and low values in a series of clock cycles, with each clock cycle taking a duration of time $T_{CLK}$ (shown in FIG. 4). For a zero bit, there is a single transition in the power signal amplitude that coincides with the rising edge of the clock signal (e.g., at $t_3$ in FIG. 4). For a one bit, there is a first transition in the power signal amplitude that coincides with the rising edge of the clock signal (e.g., at $t_1$ in FIG. 4) then a second transition in the power signal amplitude that coincides with the falling edge of the clock signal (e.g., at $t_2$ in FIG. 4).

For example, at $t_1$ the amplitude (power signal amplitude) transitions from $A_2$ to $A_1$. This indicates the start of encoding the one bit. The amplitude may remain at $A_1$ for half of one full clock cycle (e.g., $T_{CLK}/2$) then transition back to $A_2$ at $t_2$. The amplitude remains at $A_2$ for the other half of the clock cycle. At $t_3$, the encoding of the one bit is complete.

At $t_3$, the amplitude transitions from $A_2$ to $A_1$. This indicates the start of encoding the zero bit. The amplitude may remain at $A_1$ for a complete clock cycle (e.g., $T_{CLK}$) then transition back to $A_2$ at $t_4$. At $t_4$, the encoding of the zero bit is complete.

To summarize, each bit (either a 'one' or 'zero') is transmitted over the same duration of time (e.g., duration $T_{CLK}$ in FIG. 3). For a zero bit, the amplitude transitions once at the beginning of the bit and then remains at the same amplitude for the entire period of time ($T_4$ which is equal to $T_{CLK}$). For a one bit, the amplitude transitions once at the beginning of the bit and again halfway through transmission of the bit. During encoding of a one bit, the amplitude is therefore at both amplitudes $A_1$ and $A_2$ for an equal duration of time $T_3$ (that is half of $T_4/T_{CLK}$).

During encoding of bits using the differential bi-phase encoding scheme of FIG. 4, the amplitude remains constant for either a duration of time $T_3$ or $T_4$ before transitioning to the other amplitude. $T_3$ is half of $T_4$. These periods of time where the amplitude is constant may be referred to as modulation states. The modulation states (sometimes referred to as bit periods) are used to convey bits using the bit encoding scheme.

The frequency of the clock signal in FIG. 4 may be 2 kHz, as one example. In this example, each clock cycle has a duration of time ($T_{CLK}$) equal to 0.5 milliseconds. Half of the clock cycle ($T_3$) is therefore equal to 0.25 milliseconds. The modulation states (where the amplitude is constant) are therefore either 0.25 milliseconds or 0.5 milliseconds.

The examples of FIGS. 3 and 4 illustrate how the modulation states of the FSK modulation may be longer than the modulation states of the ASK modulation. In the examples of FIGS. 3 and 4, the shortest FSK modulation state is 2.33 milliseconds whereas the longest ASK modulation state is 0.5 milliseconds. Each of the FSK modulation states may be greater than each of the ASK modulation states by a factor of two or more, three or more, four or more, etc. For both the ASK and FSK modulation states, each modulation state may have a length that is an integer multiple of the shortest modulation state.

It should be noted that the specific values used in FIGS. 3 and 4 are merely illustrative. In general, any desired values may be used for the operating frequencies, clock frequencies, modulation state lengths, etc. However, in some communication schemes the FSK modulation states may be longer than the ASK modulation states as discussed in connection with FIGS. 3 and 4 above.

Consider a scenario where a power transmitting device attempts to send information (e.g., a packet) to a power receiving device using FSK modulation. Ideally, the power receiving device would detect the start of the FSK packet and receive/process the entirety of the FSK packet before taking further action (e.g., responding with an ASK packet). However, in some cases the power receiving device may fail to detect the start of the FSK packet. In these cases, the power receiving device may transmit an ASK packet to the power transmitting device, even while the power transmitting device is still attempting to transfer the FSK packet to the power receiving device.

In some communication schemes, the power transmitting device may have no way of knowing that the power receiving device failed to detect the start of an attempted FSK packet. Without the power transmitting device knowing this, the power transmitting device may continue to transfer the FSK packet until transmission is complete. Only after the FSK transmission is complete will the power transmitting device attempt to detect reception of an ASK packet from the power receiving device. This may cause delays in the reception of the ASK packet. The power transmitting device needlessly waits until the failed FSK transmission is 'complete' to receive the ASK packet. Moreover, the power transmitting device may miss some or all of the ASK packet because the ASK packet was transmitted to the power transmitting device while the power transmitting device was attempting to transmit the FSK packet (and not monitoring for a received ASK packet). By the time the power transmitting device is looking for the ASK packet, it may be too late to receive the ASK packet.

To avoid these types of problems (e.g. missed or delayed communications due to attempted simultaneous FSK and ASK packet transfer), it may be desirable for the power transmitting device to detect incoming ASK packets even while transmitting FSK packets. The presence of received ASK bits while transmitting FSK bits is indicative that the power receiving device failed to detect the start of the FSK packet. Therefore, in response to detecting incoming ASK bits while transmitting FSK bits, the power transmitting device may cease the FSK transmissions and demodulate/process the incoming ASK bits.

Figure 5:
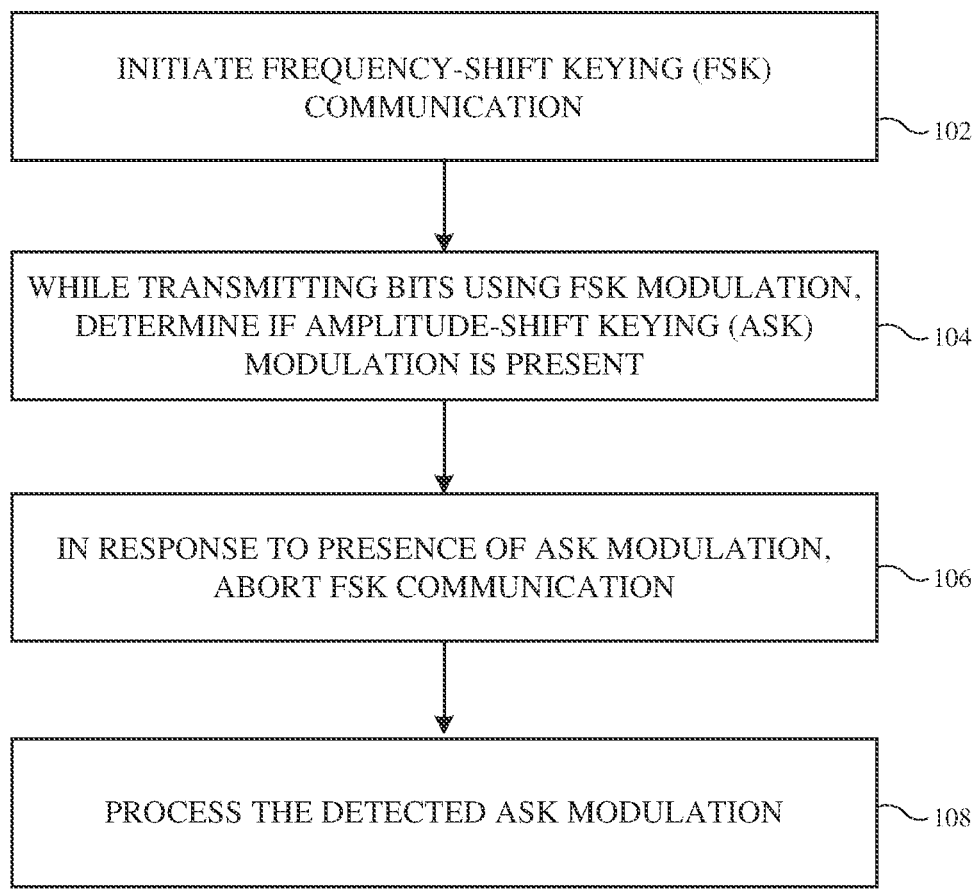
FIG. 5 is a flow chart of illustrative operations involved in operating a wireless power transmitting device in accordance with an embodiment.

FIG. 5 is a flow chart of illustrative operations involved in operating a power transmitting device (e.g., device 12 in FIG. 1). During the operations of block 102, the power transmitting device 12 may initiate a frequency-shift keying (FSK) communication. Specifically, transceiver circuitry 40 in device 12 may modulate the operating frequency of coil 36 according to a bit encoding scheme to convey bits to the power receiving device while wireless power is simultaneously being transferred to the power receiving device. The transceiver circuitry may modulate the operating frequency of coil 36 according to the bi-phase bit encoding scheme of FIG. 3, as one example. Bits transmitted using FSK modulation in this way may be part of larger bytes (e.g., groups of bits) which are in turn part of a larger data packet. The FSK communication initiated in block 102 may be intended to transmit one or more data packets containing any desired information.

During the operations of block 104, the power transmitting device may determine if amplitude-shift keying (ASK) modulation is present on the power signal (e.g., the signal transmitted from coil 36 in device 12 to coil 48 in device 24). The power transmitting device may monitor for ASK modulation while simultaneously transmitting bits to the power receiving device using FSK modulation (e.g. the ongoing communication of block 102).

It should be noted that the power transmitting device may optionally compensate for changes in frequency when monitoring for received ASK modulation signals in the power signal. During an FSK modulation state, the frequency of the power signal may be constant. Therefore, the amplitude of the power signal should also remain constant. Changes in the amplitude of the power signal within a single FSK modulation state may therefore be attributed to ASK modulations.

In an example where each FSK modulation state is longer than each ASK modulation state, the ASK modulation may be detected without any compensation. In other words, due to the disparity in the lengths of the modulation states, there will be multiple amplitude changes (e.g., multiple ASK modulation states) detected during a given FSK modulation state (without needing to compensate). However, in some cases, it may be desirable to detect amplitude changes from ASK communications across multiple FSK modulation states. This type of functionality may enable an entire ASK byte to be demodulated even while FSK communications are ongoing. Alternatively, detecting amplitude changes from ASK communications across multiple FSK modulation states may be useful in cases where the FSK modulation states are shorter than (or not much longer than) the ASK modulation states.

When the frequency of the power signal changes during FSK communications, there may be an expected change in the amplitude of the power signal. The power transmitting device may therefore compensate the detected amplitude of the power signal across different frequencies for purposes of ASK demodulation. Consider an example where a power signal is modulated between $f_1$ and $f_2$ during FSK communications. There may be an expected change in amplitude between corresponding amplitudes $A_1$ and $A_2$ each time the frequency changes. However, ASK modulation from the power receiving device may cause additional amplitude changes. The additional amplitude changes may be detected by identifying different amplitude values (e.g., such as $A_3$) and/or amplitude changes that occur asynchronously with the frequency changes.

The wireless power transmitting device may therefore optionally take into account expected amplitude changes caused by the FSK modulation when monitoring for amplitude changes caused by ASK modulation indicating communication from the power receiving device. An illustrative example of this comprises the operations of block 104 including an adjustment to a change in amplitude of the power signal synchronous (i.e. coinciding) with the transition to a new FSK modulation state, causing such synchronous changes in amplitude not to be erroneously detected as ASK modulation.

Ultimately, the wireless power transmitting device may sometimes detect the presence ASK modulation during the operations of block 104. The presence of ASK modulation is indicative that the power receiving device 24 failed to detect the FSK communication initiated in the operations of block 102. Therefore, during the operations of block 106, the power transmitting device may abort the FSK communication due to the presence of the ASK modulation. Because the power receiving device is not receiving/processing the FSK communication anyway, the power transmitting device ceases the FSK communication. After ceasing the FSK communications, the power transmitting device may still transmit a power signal to the power receiving device. In other words, wireless power continues to be transferred even though the frequency modulation for communication purposes is ceased.

Additionally, after detecting the presence of ASK modulation, the power transmitting device may process the detected ASK modulation during the operations of block 108. Specifically, transceiver circuitry 40 may demodulate the ASK modulated power signal to identify encoded bits in the power signal (transmitted from the power receiving device). The power transmitting device (e.g., the transceiver circuitry) may process the bits to identify and interpret a packet from the power receiving device and may then take corresponding action (e.g., attempt to restart FSK communication, change a wireless power transfer parameter, etc.) based on the content of the packet.

The foregoing is merely illustrative and various modifications can be made to the described embodiments. The foregoing embodiments may be implemented individually or in any combination.

What is claimed is:

1. An electronic device comprising:
   wireless power transmitting circuitry having a coil configured to transmit wireless power signals to an additional wireless charging coil; and
   control circuitry configured to:
      initiate a frequency-shift keying communication during which transmission of the wireless power signals is modulated between a first frequency and a second frequency that is different than the first frequency;
      while transmitting modulation states for the frequency-shift keying communication, determine if amplitude-shift keying modulation of the wireless power signals is present; and
      in response to determining the amplitude-shift keying modulation of the wireless power signals is present, abort the frequency-shift keying communication.

2. The electronic device of claim 1, wherein the control circuitry is further configured to:
   in response to determining the amplitude-shift keying modulation of the wireless power signals is present, process the amplitude-shift keying modulation of the wireless power signals.

3. The electronic device of claim 1, wherein the control circuitry is further configured to:
   in response to determining the amplitude-shift keying modulation of the wireless power signals is present, demodulate the amplitude-shift keying modulation of the wireless power signals to identify amplitude-shift keying modulation states.

4. The electronic device of claim 1, wherein determining the amplitude-shift keying modulation of the wireless power signals is present comprises identifying a change in an amplitude of the wireless power signals while the wireless power signals are transmitted at the first frequency.

5. The electronic device of claim 1, wherein determining the amplitude-shift keying modulation of the wireless power signals is present comprises identifying multiple amplitude changes in the wireless power signals while the wireless power signals are transmitted at the first frequency.

6. The electronic device of claim 1, wherein, during the frequency-shift keying communication, the wireless power signals are transmitted at the first frequency and the second frequency for a plurality of sequential frequency-shift keying modulation states, wherein, during amplitude-shift keying modulation, the wireless power signals have a first amplitude and a second amplitude for a plurality of sequential amplitude-shift keying modulation states, and wherein each of the frequency-shift keying modulation states has a duration that is longer than each of the amplitude-shift keying modulation states.

7. The electronic device of claim 6, wherein the duration of each of the frequency-shift keying modulation states is at least two times longer than each of the amplitude-shift keying modulation states.

8. The electronic device of claim 6, wherein the duration of each of the frequency-shift keying modulation states is an integer multiple of the shortest frequency-shift keying modulation state.

9. The electronic device of claim 6, wherein the duration of each of the amplitude-shift keying modulation states is an integer multiple of the shortest amplitude-shift keying modulation state.

10. The electronic device of claim 1, wherein the control circuitry is configured to:
    after aborting the frequency-shift keying communication, use the coil to transmit the wireless power signals at a constant frequency.

11. The electronic device of claim 10, wherein the constant frequency is a selected one of the first frequency and the second frequency.

12. The electronic device of claim 1, wherein the amplitude-shift keying modulation is caused by an additional electronic device that includes the additional wireless charging coil.

13. The electronic device of claim 1, wherein determining the amplitude-shift keying modulation of the wireless power signals is present comprises identifying amplitude-shift keying modulation in the wireless power signals across multiple modulation states for the frequency-shift keying communication.

14. A non-transitory computer-readable storage medium storing one or more programs configured to be executed by one or more processors of an electronic device comprising wireless power transmitting circuitry having a coil configured to transmit wireless power signals to an additional wireless charging coil, the one or more programs including instructions for:
    initiating a frequency-shift keying communication during which transmission of the wireless power signals is modulated between a first frequency and a second frequency that is different than the first frequency;
    while transmitting modulation states for the frequency-shift keying communication, determining if amplitude-shift keying modulation of the wireless power signals is present; and
    in response to determining the amplitude-shift keying modulation of the wireless power signals is present, aborting the frequency-shift keying communication.

15. The non-transitory computer-readable storage medium of claim 14, wherein the one or more programs further include instructions for:
    in response to determining the amplitude-shift keying modulation of the wireless power signals is present, demodulating the amplitude-shift keying modulation of the wireless power signals to identify amplitude-shift keying modulation states.

16. The non-transitory computer-readable storage medium of claim 14, wherein determining the amplitude-shift keying modulation of the wireless power signals is present comprises identifying multiple amplitude changes in the wireless power signals while the wireless power signals are transmitted at the first frequency.

17. The non-transitory computer-readable storage medium of claim 14, wherein, during the frequency-shift keying communication, the wireless power signals are transmitted at the first frequency and the second frequency for a plurality of sequential frequency-shift keying modulation states, wherein, during amplitude-shift keying modulation, the wireless power signals have a first amplitude and a second amplitude for a plurality of sequential amplitude-shift keying modulation states, and wherein each of the frequency-shift keying modulation states has a duration that is longer than each of the amplitude-shift keying modulation states.

18. The non-transitory computer-readable storage medium of claim 17, wherein the duration of each of the frequency-shift keying modulation states is an integer multiple of the shortest frequency-shift keying modulation state.

19. The non-transitory computer-readable storage medium of claim 17, wherein the duration of each of the amplitude-shift keying modulation states is an integer multiple of the shortest amplitude-shift keying modulation state.

20. The non-transitory computer-readable storage medium of claim 14, wherein the one or more programs further include instructions for:
after aborting the frequency-shift keying communication, using the coil to transmit the wireless power signals at a constant frequency.

21. A method of operating an electronic device comprising wireless power transmitting circuitry having a coil configured to transmit wireless power signals to an additional wireless charging coil, the method comprising:
initiating a frequency-shift keying communication during which transmission of the wireless power signals is modulated between a first frequency and a second frequency that is different than the first frequency;
while transmitting modulation states for the frequency-shift keying communication, determining if amplitude-shift keying modulation of the wireless power signals is present; and
in response to determining the amplitude-shift keying modulation of the wireless power signals is present, aborting the frequency-shift keying communication.

22. The method of claim 21, further comprising:
in response to determining the amplitude-shift keying modulation of the wireless power signals is present, demodulating the amplitude-shift keying modulation of the wireless power signals to identify amplitude-shift keying modulation states.

23. The method of claim 21, wherein determining the amplitude-shift keying modulation of the wireless power signals is present comprises identifying multiple amplitude changes in the wireless power signals while the wireless power signals are transmitted at the first frequency.

24. The method of claim 21, wherein, during the frequency-shift keying communication, the wireless power signals are transmitted at the first frequency and the second frequency for a plurality of sequential frequency-shift keying modulation states, wherein, during amplitude-shift keying modulation, the wireless power signals have a first amplitude and a second amplitude for a plurality of sequential amplitude-shift keying modulation states, and wherein each of the frequency-shift keying modulation states has a duration that is longer than each of the amplitude-shift keying modulation states.

* * * * *